United States Patent
Steinbuch

(10) Patent No.: US 7,304,604 B2
(45) Date of Patent: Dec. 4, 2007

(54) RADAR SENSOR AND METHOD FOR OPERATING A RADAR SENSOR

(75) Inventor: Dirk Steinbuch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 10/535,739

(22) PCT Filed: Oct. 27, 2003

(86) PCT No.: PCT/DE03/03563

§ 371 (c)(1),
(2), (4) Date: Oct. 6, 2005

(87) PCT Pub. No.: WO2004/051305

PCT Pub. Date: Jun. 17, 2004

(65) Prior Publication Data

US 2006/0125683 A1    Jun. 15, 2006

(30) Foreign Application Priority Data

Dec. 3, 2002    (DE) ............................... 102 56 330

(51) Int. Cl.
*G01S 13/26* (2006.01)
(52) U.S. Cl. .................. 342/203; 342/21; 342/192; 342/204; 342/137
(58) Field of Classification Search ................. 342/203
See application file for complete search history.

(56) References Cited

U.S. PATENT DOCUMENTS

| | | | | |
|---|---|---|---|---|
| 4,427,982 A * | 1/1984 | Caprio | ......................... | 342/159 |
| 6,067,040 A * | 5/2000 | Puglia | ......................... | 342/134 |
| 7,148,841 B2 * | 12/2006 | Yoneda et al. | .............. | 342/132 |

FOREIGN PATENT DOCUMENTS

| DE | 199 63 005 | 6/2001 |
|---|---|---|
| WO | WO 01/48510 | 7/2001 |
| WO | WO 02/054104 | 7/2002 |

OTHER PUBLICATIONS

Skolnik, Merrill, "Introduction to Radar Systems," 2nd Edition, McGraw-Hill Book Company, pp. 160-161.

* cited by examiner

*Primary Examiner*—Thomas H. Tarcza
*Assistant Examiner*—Shelley Chen
(74) *Attorney, Agent, or Firm*—Kenyon & Kenyon LLP

(57) ABSTRACT

In a radar sensor, a continuous microwave signal is passed through an RF switch which is periodically controlled by a pulse signal. The pulse signal is frequency modulated in such a way that the spectrum of the pulse signal is expanded without decorrelation occurring. Using this arrangement, the noise level is kept low and the detection range is increased.

13 Claims, 5 Drawing Sheets

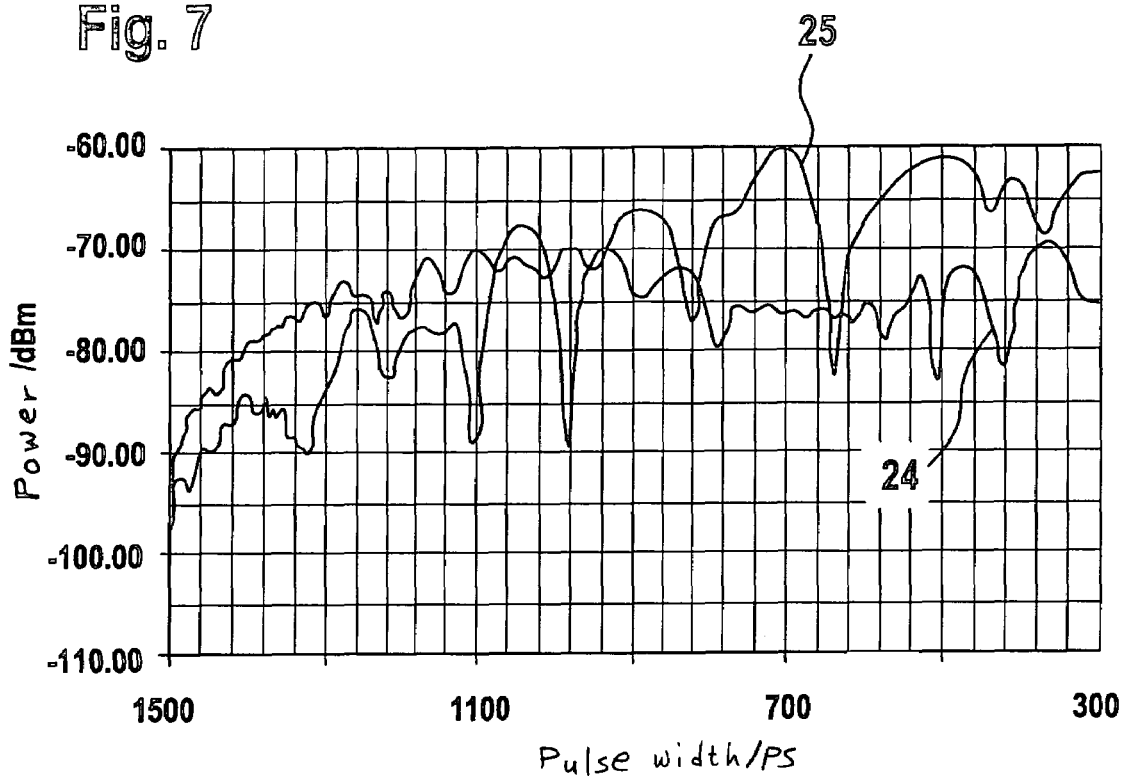
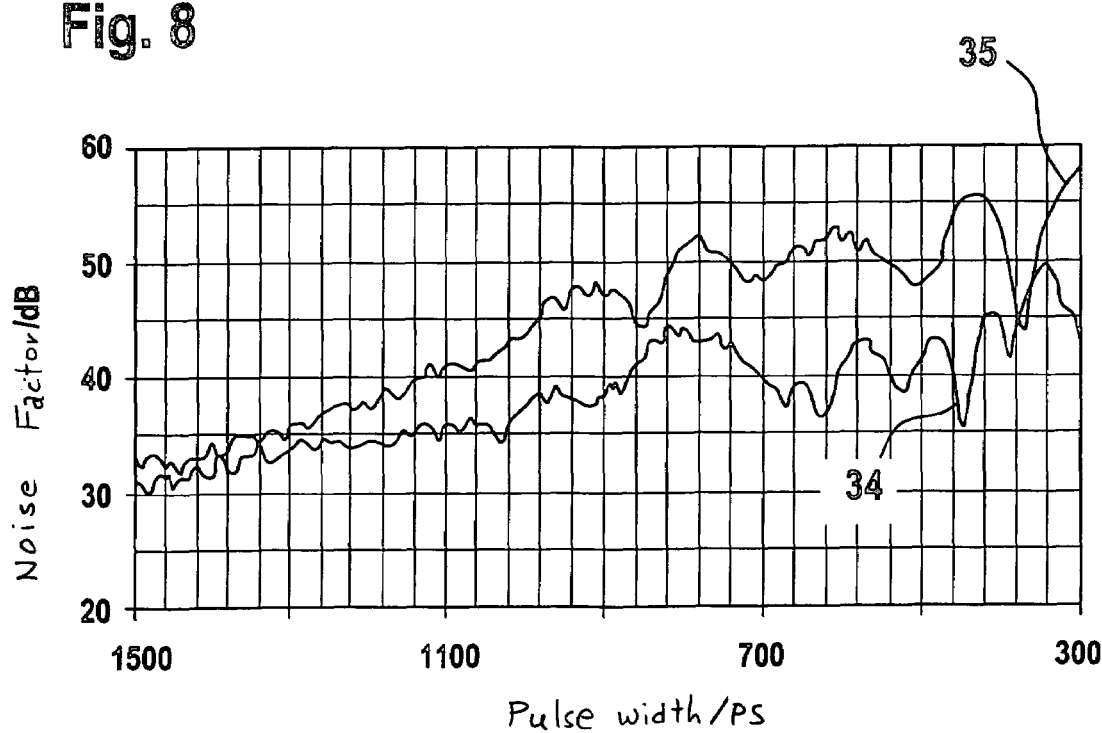

RADAR SENSOR AND METHOD FOR OPERATING A RADAR SENSOR

FIELD OF THE INVENTION

The present invention is directed to a method for operating a radar sensor whose radar pulses are generated by passing a continuous microwave signal through an RF switch which is periodically controlled by a pulse signal.

BACKGROUND INFORMATION

*Introduction to Radar Systems*, by Merril I. Skolnik, 2$^{nd}$ edition, McGraw-Hill Book Company, pp. 160 and 161, describes radar pulses being emitted for a mono-pulse tracking radar, and the radar pulses reflected from objects being supplied to a mixer. The mixed received pulses are supplied to an amplitude detector for obtaining a range signal, and to a phase detector for obtaining an angular error signal.

Published German patent document DE 199 63 005 describes a continuous microwave signal being passed through an RF switch, which is periodically controlled by a pulse signal, to generate radar pulses. The receive-side mixer also receives a continuous microwave signal passed through an RF switch as a reference signal. The pulse signal for controlling the receive-side RF switch is delayed by the propagation time of the reflected radar pulse.

SUMMARY

The modulation of the pulse signal according to the present invention for controlling the RF switch in the transmission branch expands the spectral lines of the pulse signal without occurrence of decorrelation. As a result, regardless of the frequency drift, always the same noise level, which is approximately equal to the minimum achievable noise level regardless of the relative position of the LO (local oscillator) frequency and PRF (pulse repeat frequency), appears on the receive side after mixing the radar signal in the CF position. The critical case of $f_{LO}$=n*PRF is thus circumvented. Due to this optimization of the noise level, the detection range of the short-range radar (SRR) may be increased, e.g., from 7 m to 14 m, without the received signals of the objects to be detected getting lost in the noise depending on the characteristics of the object, which would make reliable detection impossible.

The edge steepness and thus the harmonic components of the baseband pulse may be reduced by appropriate filtering of the input signal and/or output signal of the RF switch.

The harmonics may also be reduced by using diodes having a linear characteristic, e.g., PIN diodes, as RF switches. The required rapid switching times for the SRR, e.g., 400 ps for radar pulses, may be achieved using PIN diodes having a very thin intrinsic layer.

The noise factor may be further reduced by using diode pairs in the receive mixer, i.e., phase detector, and also in the transmission-side RF switch. In particular, the phase detector may advantageously have a diode pair on a chip within a ring mixer having strip conductors.

An oscillator for controlling the RF switch, oscillating in a clean mode and having an output-side buffer amplifier operated at saturation, may be provided to reduce the amplitude noise.

In contrast with a previously mentioned mono-pulse tracking radar known in the art, in the method according to the present invention a normal pulse radar having extremely short pulses is used.

FIG. 7 shows the power of a baseband spectral line plotted against the RF pulse width both with and without baseband pulse shaping.

FIG. 8 shows the noise factor plotted against the RF pulse width using Schottky and PIN diodes.

DETAILED DESCRIPTION

Figure 1:
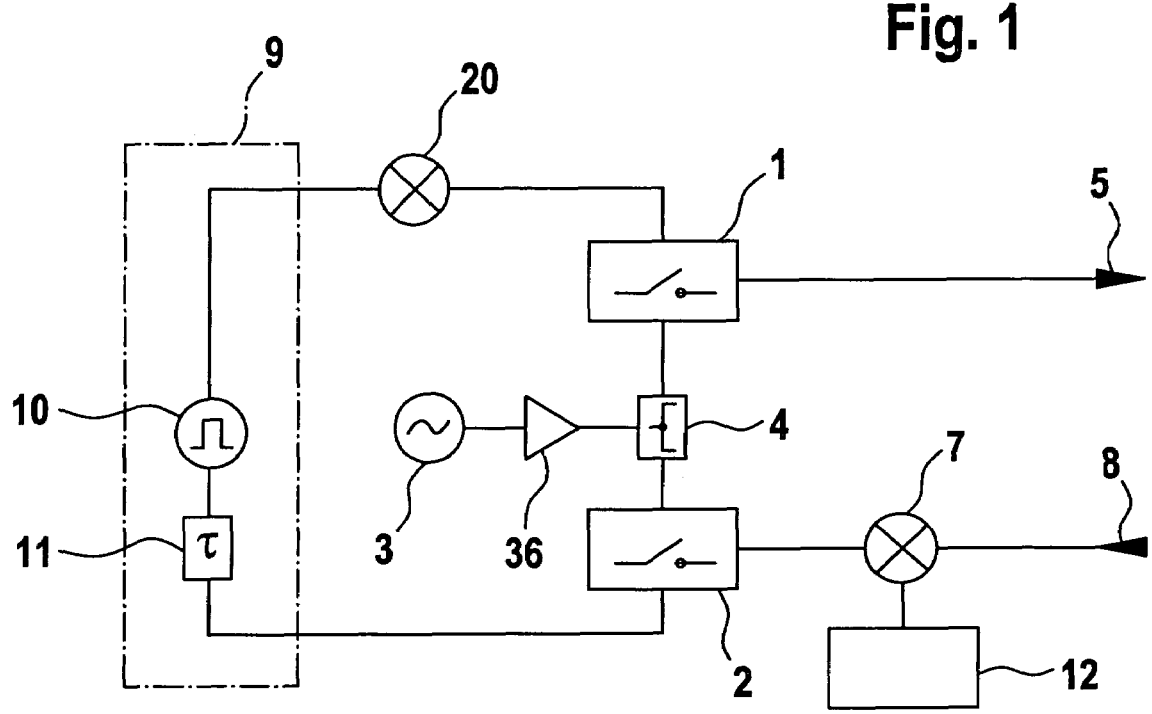
FIG. 1 shows a block diagram of a radar sensor according to the present invention.

An oscillator 3 for microwave signals, which delivers a continuous high-frequency signal (CW signal), is provided in the radar sensor of FIG. 1. This high-frequency signal is supplied, via a signal splitter in the form of hybrid circuit 4, to the input of a transmission-side RF switch 1 for transmitting radar pulses to transmission antenna 5 and to a receive-side RF switch 2, which controls a receive mixer 7 in the signal path to a receive antenna 8. Transmission-side RF switch 1 is controlled by control unit 9, which has a pulse signal source 10, and a delay circuit 11. If pulse signal source 10 delivers a pulse, the high-frequency wave of oscillator 3 is supplied, for the duration of this pulse, to the transmission antenna via RF switch 1. The echo signal reflected from an object is supplied to mixer 7, which receives a reference signal via switch 2 if delay circuit 11 is set for a certain range in which the objects are to be detected according to a desired time gate. If the same high-frequency sources are applied to both inputs of mixer 7, a CF (constant frequency) output signal, proportional to the coincidence, is obtained, which is further processed in an analyzer circuit 12.

The SSR system is typically operated using a pulse repeat frequency PRF of 5 MHz for pulse signal source 10, for example, which means that a pulse is emitted every 200 ns. The PRF is derived from a very pure quartz and has negligible phase jitter. The control pulse, referred to hereinafter as baseband pulse, for the RF switch has a width of 400 ps. The spectrum of the baseband pulse corresponds to the Fourier transform of the pulse in the time range and has a sin(x)/x shape around 0 Hz and spectral lines spaced at the pulse repeat frequency. RF switch 1 unintendedly operates as a harmonic multiplier for the baseband pulse, because the switch output is not band-limited. Therefore, the spectral lines of the baseband pulse are multiplied beyond 24.125 GHz. The baseband pulse spectral lines are highly expanded by this multiplication, i.e., have a very high phase jitter around 24.125 GHz, although they are derived from a very pure source. This undesirable, highly multiplied baseband pulse spectrum and the desired spectrum, which is obtained by modulating the 24.125 GHz CW signal using the baseband pulse and represents the actual receive pulse, now overlap around 24.125 GHz. Due to the fact that the baseband pulse spectral lines have a very high phase jitter, both spectra are demodulated in the phase detector because detectable phase jitter components of the baseband pulse spectral lines occur even at ±PRF/2 and in the CF band widths of the receive pulse spectral lines. Because not only one spectral line pair, but all available pairs are similarly demodulated with respect to one another, the CF noise and therefore the system noise factor increase considerably. Although there is an optimum distance of PRF/2 of the baseband pulse spectrum from the receive pulse spectrum, the RF frequency will drift with the temperature; therefore, the noise factor will change considerably and, in the most unfavorable case, perfect overlap and sporadic noise will occur.

Since the demodulation of the phase jitter of the baseband pulse spectral lines cannot be prevented using the receive pulse spectral lines, and, in particular, the fluctuations of the noise with the temperature are barely controllable, according to the present invention frequency modulation (PRF modulation) of the pulse signal is used for controlling RF switch 1 via modulator stage 20, which ensures, regardless of the frequency drift, that the same noise level, approximately corresponding to the minimum achievable noise level, always occurs at the CF output. The PRF is frequency-modulated, the frequency shift being 1 kHz, for example, and the modulation frequency being 10 kHz, for example. The low modulation index of 0.1 ensures that the radar signal does not decorrelate by itself. Harmonic multiplication also multiplies the modulation index; a factor 4,850 is required to get, for example, from 5 MHz to 24.125 GHz. This results in an intended, extreme expansion of the individual base pulse spectral lines. This extreme expansion results in an almost flat baseband pulse spectrum. Thus, independent of the frequency offset of n*PRF with respect to the RF, the CF bandwidths of the individual receive pulse spectral lines have the same power. This flatness therefore results in a constant noise factor, which is almost equal to the optimum noise factor at optimum frequency offset.

Figure 2:
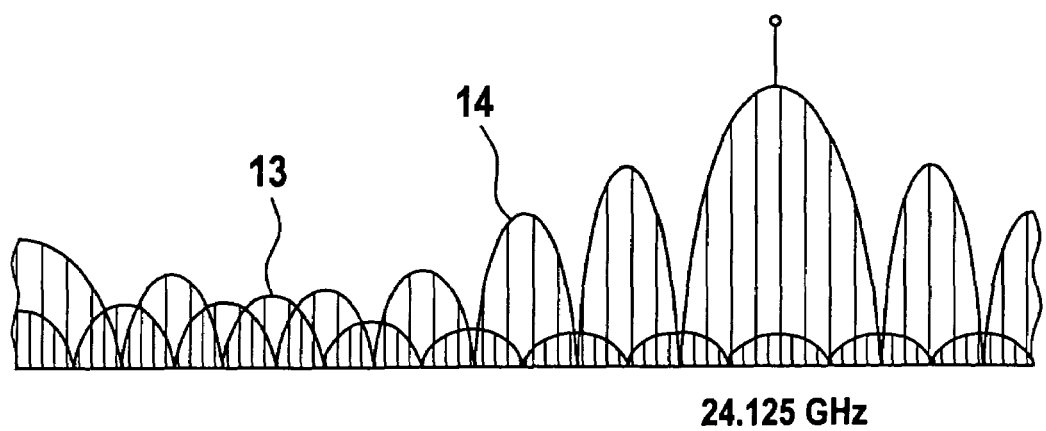
FIG. 2 shows a comparison of the baseband pulse spectrum and receive pulse spectrum.
Figure 3:
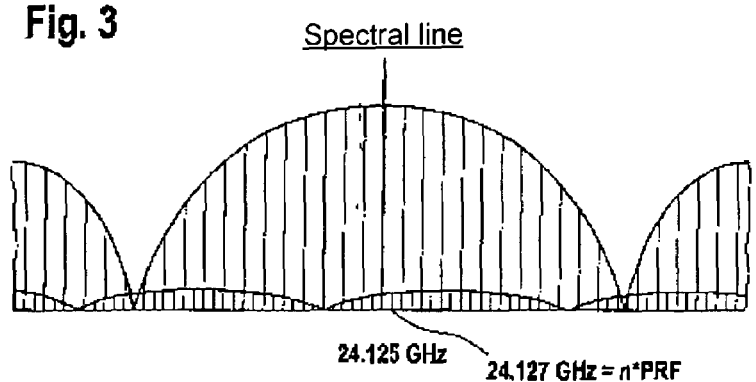
FIGS. 3 and 4 show the demodulation of the phase jitter of the baseband pulse spectral line and the adjacent receive pulse spectral line within the CF bandwidth.
Figure 4:
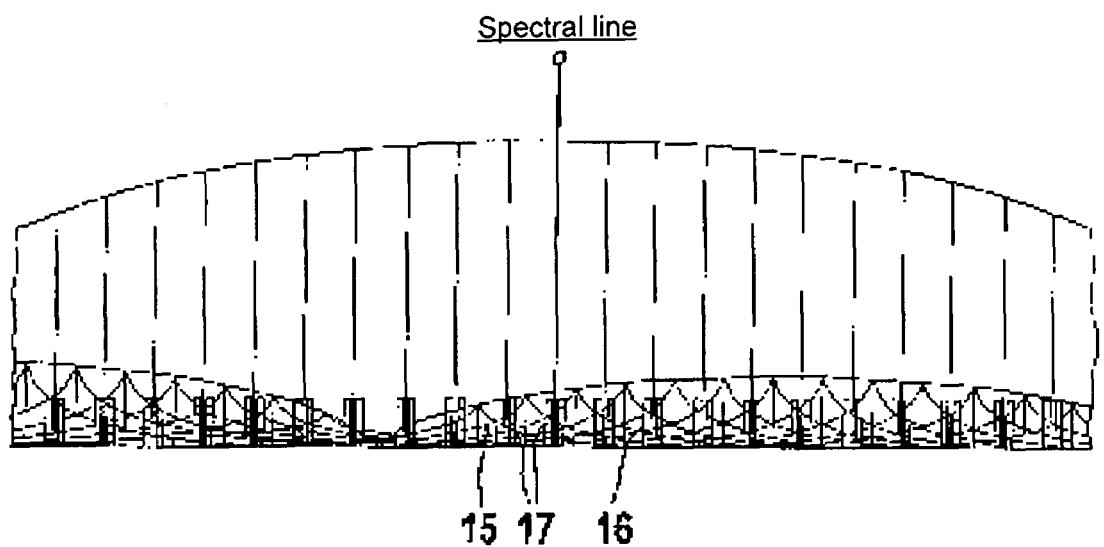
Figure 5:
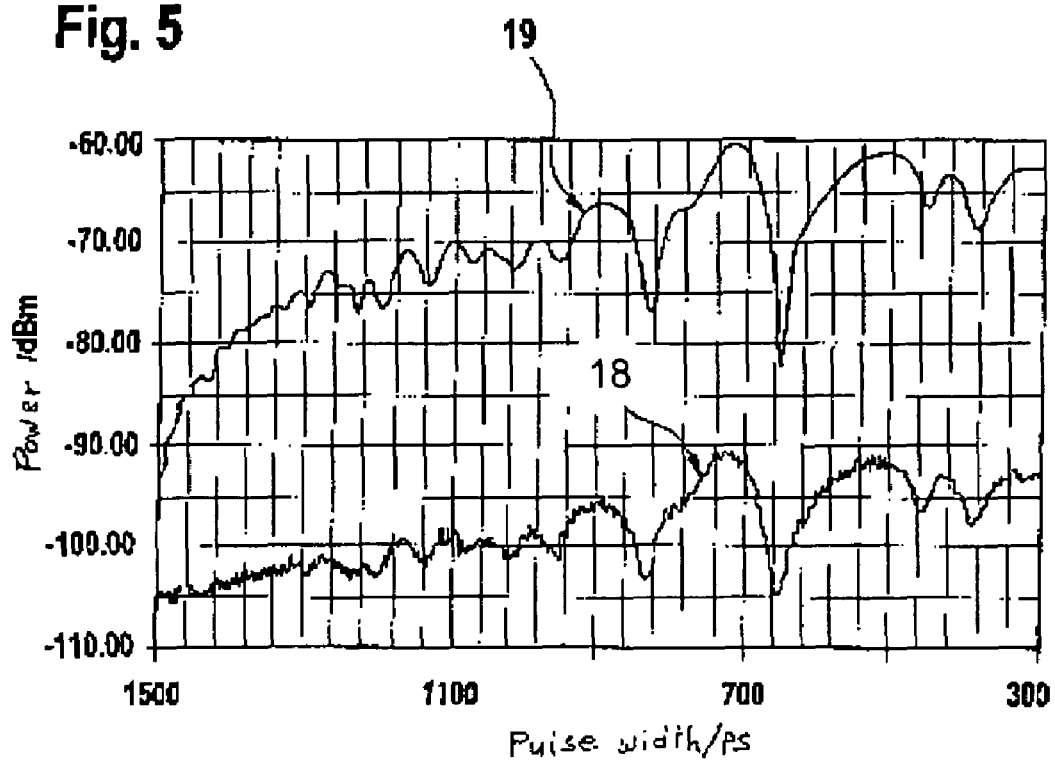
FIG. 5 shows the power of a baseband pulse spectral line plotted against the RF pulse width both with and without modulation of the pulse signal for controlling the transmission-side RF switch.

FIG. 2 shows the comparison between baseband pulse spectrum and receive pulse spectrum, i.e., baseband pulse spectrum 13 and LO spectrum 14 modulated using the carrier. FIGS. 3 and 4 are enlarged graphs of the baseband pulse spectral line phase jitter, demodulated using the adjacent receive pulse spectral line within the CF bandwidth. Reference symbol 15 identifies the expanded phase jitter of the highly multiplied PRF spectral lines, and reference symbol 16 identifies the CF bandwidth in which signals may be demodulated. Reference symbol 17 shows how highly multiplied phase jitter falls into the CF bandwidths and is demodulated. FIG. 5 shows the power of a baseband pulse spectral line at n*PRF=24.125 GHz plotted against the RF pulse width in ps with (reference numeral 18) and without (reference numeral 19) PRF modulation. An improvement by 30 dB may be observed in the most unfavorable case of perfect overlap.

Because the baseband pulse spectral lines have an extreme phase jitter, this phase jitter is demodulated via the spectral lines of the receive pulse. This phenomenon occurs for each spectral line pair and is added up without correlation. This demodulated signal has the character of noise and increases the CF noise and thus the system noise factor. By reducing the harmonics of the baseband pulse around 24 GHz, the noise factor may be further reduced. The power of the harmonics of the baseband pulse around 24 GHz does not depend on the baseband pulse width, but rather on the edge steepness of the pulse. The edge steepness and thus the harmonics may be reduced by appropriate pulse shaping.

One approach involves low pass filtering, which may be achieved, for example, by using a 10 pF capacitor at the input of RF switch 1. Another option is the use of a Gaussian filter or another filter for more exact pulse shaping and more controlled harmonics reduction, and thus improving the noise factor.

Figure 6:
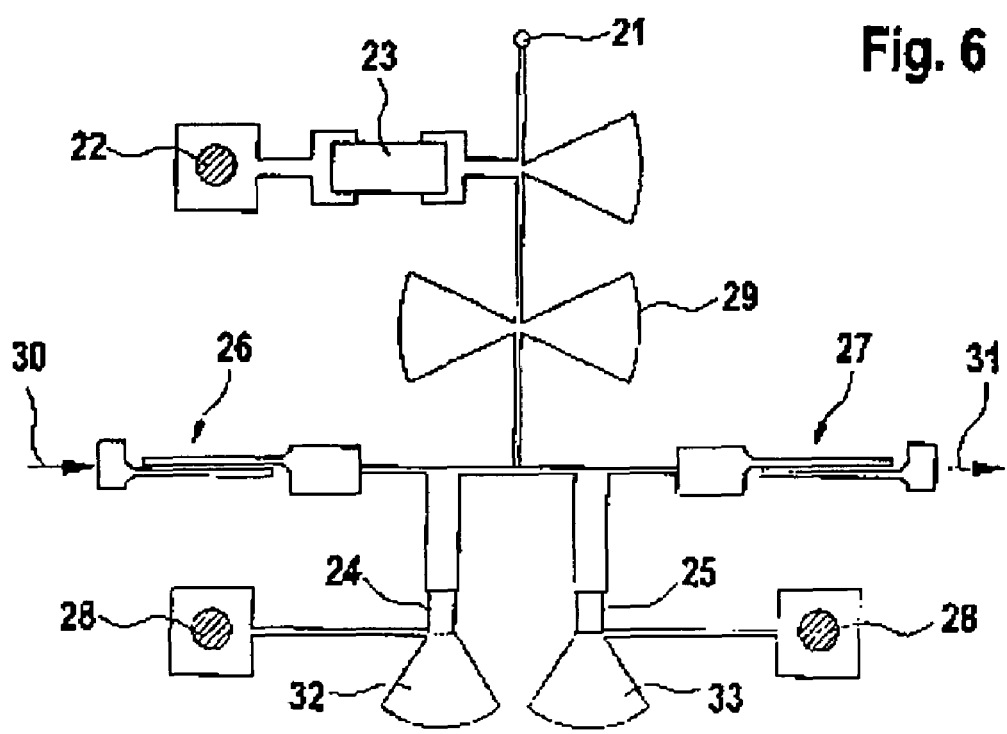
FIG. 6 shows the transmission-side RF switch having pulse shaping.

The demodulation mechanism of the baseband and receive pulse spectral lines is shown in FIGS. 2 through 4. FIG. 6 shows one possible implementation of pulse shaping by filtering. RF switch illustrated in FIG. 6 has a capacitor 23 for pulse shaping (low-pass) between control input 21 for the baseband pulse, which may be frequency modulated, and ground terminal 22. After undergoing a λ/4-transformation at element 29, the baseband pulse is supplied to a diode pair 24, 25 which is connected to ground 28. In the conducting state, the diode pair 24, 25 connects, in the form of finger couplers, the output signal of oscillator 3 applied to input 30 to transmission antenna 5 via blocking circuits 26, 27 and output 31 for a baseband pulse. Transformation circuits 32 and 33 form RF short circuits. Switch 1 has a strictly symmetric design except for the side branch in the form of capacitor 23. Therefore, it allows an insulation resistance (conducting state/blocking state) of 50 dB to be achieved.

FIG. 7 shows the measurement results of the baseband pulse spectral line at 24.125 GHz: Power/dBm against pulse width/ps with (reference numeral 24) and without (reference numeral 25) pulse shaping. As is evident from FIG. 7, an improvement of 10 dB in the noise factor is achievable.

The phase jitter generated by the baseband spectral lines may be reduced by reducing the harmonics of the baseband pulse around 24 GHz. These harmonics are generated in RF switch 1, for example, by two Schottky diodes. These diodes are used because they switch very rapidly due to the physical characteristics of the Schottky metal layer. However, they have an extremely non-linear characteristic, which makes them suitable for mixer applications. This non-linearity is very disadvantageous for the switch, because it is this characteristic in particular that makes it possible to effectively generate the harmonics of the baseband pulse. To overcome these disadvantages, diodes having a linear characteristic, such as PIN diodes, for example, are used. These diodes generate harmonics that are lower by 10 dB and result in a noise factor which, depending on the pulse shape, is also lower by this order of magnitude. The problem of inertia of these diodes with respect to the very rapid pulse of 400 ps (typical switching times>2 ns are preferred) may be circumvented by using PIN diodes having very thin intrinsic layers (i-layers of less than 2 μm), which are able to switch more rapidly. GaAs PINs having very thin i-layers are able to switch rapidly up to 400 ps and are therefore suitable, while the predefined operating parameters of the SRR radar are preserved.

FIG. 8 shows the reduction of the noise factor by using PIN diodes (reference numeral 34) compared to Schottky diodes (reference numeral 35).

The above-described SRR system, having a typical pulse repeat frequency of 5 MHz and a typical RF pulse width of 400 ps, has an output spectrum of the receive switch which is centered around the 24.125 GHz carrier frequency, for example, and has consecutive spectral lines spaced at the pulse repeat frequency and a shape corresponding to the Fourier transform of the RF pulse. Each individual spectral line is derived from the carrier, i.e., has the carrier's amplitude and phase jitter. This spectrum is supplied to the phase detector, i.e., receive mixer 7. A simply balanced phase detector theoretically provides perfect AM suppression, i.e., the amplitude noise of the local oscillator signal is extinguished in phase opposition. In practice, approximately 20 dB is achievable at a frequency of 24 GHz, for example. The phase detector thus may function as a poor AM demodulator. Because of the plurality of spectral lines, the individually demodulated amplitude noise is added up without correlation and is manifested in an increased noise level at the CF output, resulting in a higher noise factor.

To lower the system noise factor, e.g., the amplitude noise, it should be ensured that oscillator 3 oscillates in a clean mode. In addition, it is effective to place an insulator in the form of buffer amplifier 36, operated at saturation, downstream from oscillator 3 to ensure low amplitude noise. A clean voltage supply to buffer amplifier 36 is highly advantageous.

Figure 9:
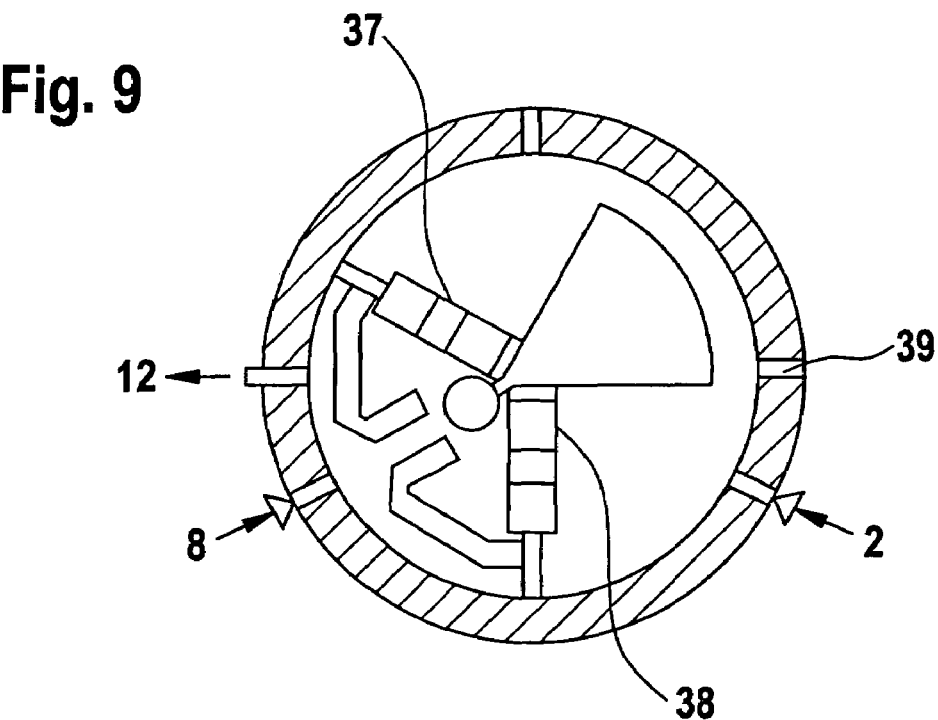
FIG. 9 shows a schematic illustration of a layout for a phase detector.
Figure 10:
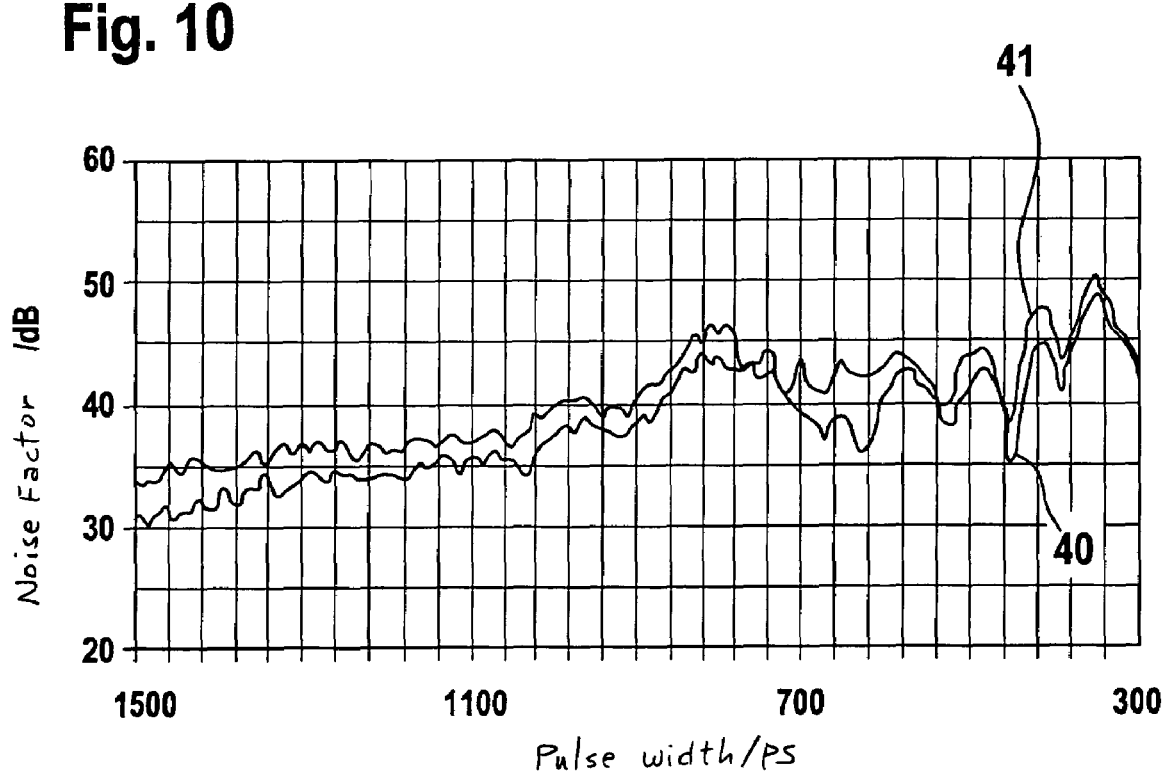
FIG. 10 shows the noise factor plotted against the RF pulse width using sources having different amplitude noise.

The noise factor may be further lowered by improving the balance of the phase detector. For this purpose, instead of using two physically separate diodes, two diode junctions (diode pair 37, 38) are used on a chip, which, according to FIG. 9, is placed in the center within, rather than outside of, ring mixer 39. This has the advantage of the diode junctions being almost identical, which improves the balance. The use of an alternative phase detector, for example, a double-balanced detector having improved AM suppression, is also advantageous. The amplitude noise is shown in FIGS. 2 through 4. FIG. 10 shows the system noise factor in the case of two different oscillators, a DRO (reference numeral 41) and a Gunn oscillator (reference numeral 40) which has a 10 dB lower noise. The noise factor may be lowered by a few dB.

What is claimed is:

1. A method for operating a radar sensor, comprising:
   generating radar pulses by passing a continuous microwave signal through an RF switch that is periodically controlled by a pulse signal; and
   modulating the pulse signal for controlling the RF switch in such a manner whereby the spectral lines of the pulse signal are expanded without causing any degree of decorrelation between the modulated and unmodulated pulse signals.

2. The method as recited in claim 1, wherein at least one of an input signal and an output signal of the RF switch is one of low-pass filtered and band-pass filtered.

3. The method as recited in claim 1, wherein the pulse signal is frequency modulated, and wherein the modulation index in frequency modulating the pulse signal is selected to be approximately 0.1.

4. A radar sensor, comprising:
   an oscillator for generating a continuous microwave signal;
   at least one RF switch in a transmission branch and at least one RF switch in a receiving branch; and
   a control unit for controlling the RF switches;
   wherein the at least one RF switch in the transmission branch receives a frequency-modulated pulse signal from the control unit, whereby radar pulses are generated by passing the continuous microwave signal through the at least one RF switch in the transmission branch that is periodically controlled by the frequency-modulated pulse signal from the control unit, and wherein the frequency-modulated pulse signal from the control unit for controlling the at least one RF switch in the transmission branch is modulated in such a manner whereby the spectral lines of the pulse signal are expanded without causing any degree of decorrelation between the modulated and unmodulated pulse signals.

5. The radar sensor as recited in claim 4, wherein the at least one RF switch in the transmission branch and the at least one RF switch in the receiving branch are diode switches having a linear characteristic.

6. The radar sensor as recited in claim 5, wherein the diode switches are PIN diode switches having thin intrinsic layers.

7. The radar sensor as recited in claim 6, wherein the intrinsic layers of the PIN diode switches are dimensioned in such a manner whereby switching times of up to 400 ps are achieved.

8. The radar sensor as recited in claim 4, wherein the at least one RF switch in the transmission branch includes a pair of diodes that are connected to ground, and wherein the pair of diodes, in the conducting state, connect the continuous microwave signal from the oscillator to a transmission antenna via blocking circuits.

9. The radar sensor as recited in claim 8, wherein the blocking circuits have finger couplers.

10. The radar sensor as recited in claim 4, further comprising a buffer amplifier, wherein the output of the oscillator is connected to the buffer amplifier operated at saturation.

11. The radar sensor as recited in claim 4, wherein the oscillator is a Gunn oscillator.

12. The radar sensor as recited in claim 4, further comprising a mixer provided on the receiving branch, wherein the mixer has a diode pair for analyzing received radar signals.

13. The radar sensor as recited in claim 12, wherein the pair of diodes are situated adjacent to one another on a chip, and wherein the pair of diodes are situated within a ring mixer having strip conductors.

* * * * *